US010302971B2

(12) United States Patent
Montalban

(10) Patent No.: US 10,302,971 B2
(45) Date of Patent: May 28, 2019

(54) PROCESS FOR ASSEMBLING AN ELASTIC HINGE FOR EYEGLASS FRAMES, AND ELASTIC HINGE FOR EYEGLASS FRAMES

(71) Applicant: VISOTTICA INDUSTRIE S.p.A., Susegana (IT)

(72) Inventor: Rinaldo Montalban, Venice (IT)

(73) Assignee: VISOTTICA INDUSTRIE S.P.A., Susegana (IT)

( * ) Notice: Subject to any disclaimer, the term of this patent is extended or adjusted under 35 U.S.C. 154(b) by 50 days.

(21) Appl. No.: 15/644,783

(22) Filed: Jul. 9, 2017

(65) Prior Publication Data
US 2018/0011345 A1 Jan. 11, 2018

(30) Foreign Application Priority Data
Jul. 8, 2016 (IT) .......... 102016000071595

(51) Int. Cl.
*G02C 5/16* (2006.01)
*G02C 13/00* (2006.01)
*G02C 5/22* (2006.01)

(52) U.S. Cl.
CPC .......... *G02C 13/001* (2013.01); *G02C 5/2218* (2013.01); *G02C 5/2236* (2013.01); *G02C 5/2281* (2013.01); *G02C 2200/26* (2013.01)

(58) Field of Classification Search
CPC .......... G02C 5/22; G02C 5/16; G02C 5/2263; G02C 2200/22; G02C 5/2218; G02C 5/2254; G02C 5/2272; G02C 5/2227; G02C 5/2236; G02C 5/2281; G02C 9/02

USPC .......... 351/113, 114, 111; 16/228
See application file for complete search history.

(56) References Cited

U.S. PATENT DOCUMENTS 4,222,148 A * 9/1980 Zellweger ............ G02C 5/2227
16/228
6,353,965 B1 * 3/2002 Lo .......... G02C 5/2236
16/228

FOREIGN PATENT DOCUMENTS

| DE | 102007048011 A1 | 4/2009 |
|---|---|---|
| EP | 0345145 A1 | 12/1989 |
| EP | 0931948 A1 | 7/1999 |
| FR | 2658570 A1 | 8/1991 |
| GB | 781819 A | 8/1957 |
| IT | 2007A000224 | 11/2007 |
| WO | 2005001551 A1 | 1/2005 |

* cited by examiner

*Primary Examiner* — Hung X Dang
(74) *Attorney, Agent, or Firm* — Mark M. Friedman

(57) ABSTRACT

Process for assembling an elastic hinge for eyeglass frames comprising a first articulation provided with a head with a first hole, a second articulation having two shoulders provided with second holes, and a pin having a stem provided with a thinned final portion. The process provides for inserting the head of the first articulation between the two shoulders of the second articulation with the first hole of the first articulation non-aligned with respect to the second holes of the second articulation, an opening thus remaining between such holes. A step for inserting the pin is provided, during which the thinned portion of the pin is wedged in the aforesaid opening between the holes and is screwed into one of the second holes of the shoulders of the second articulation.

11 Claims, 8 Drawing Sheets

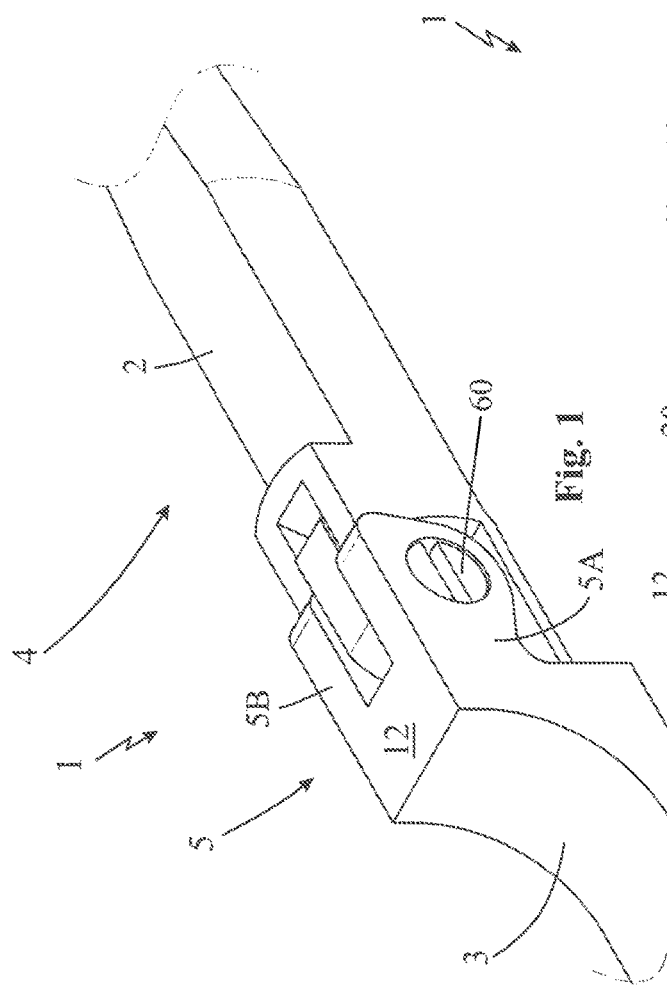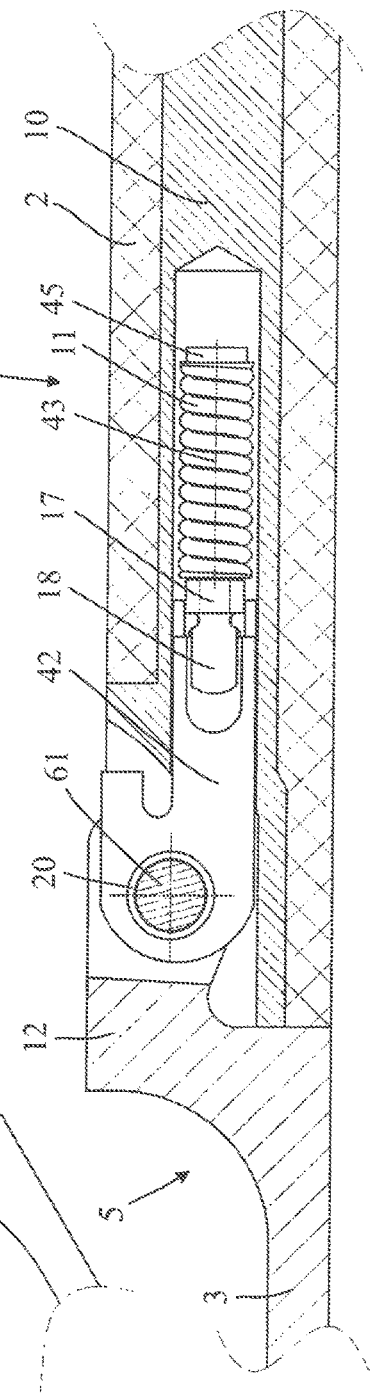

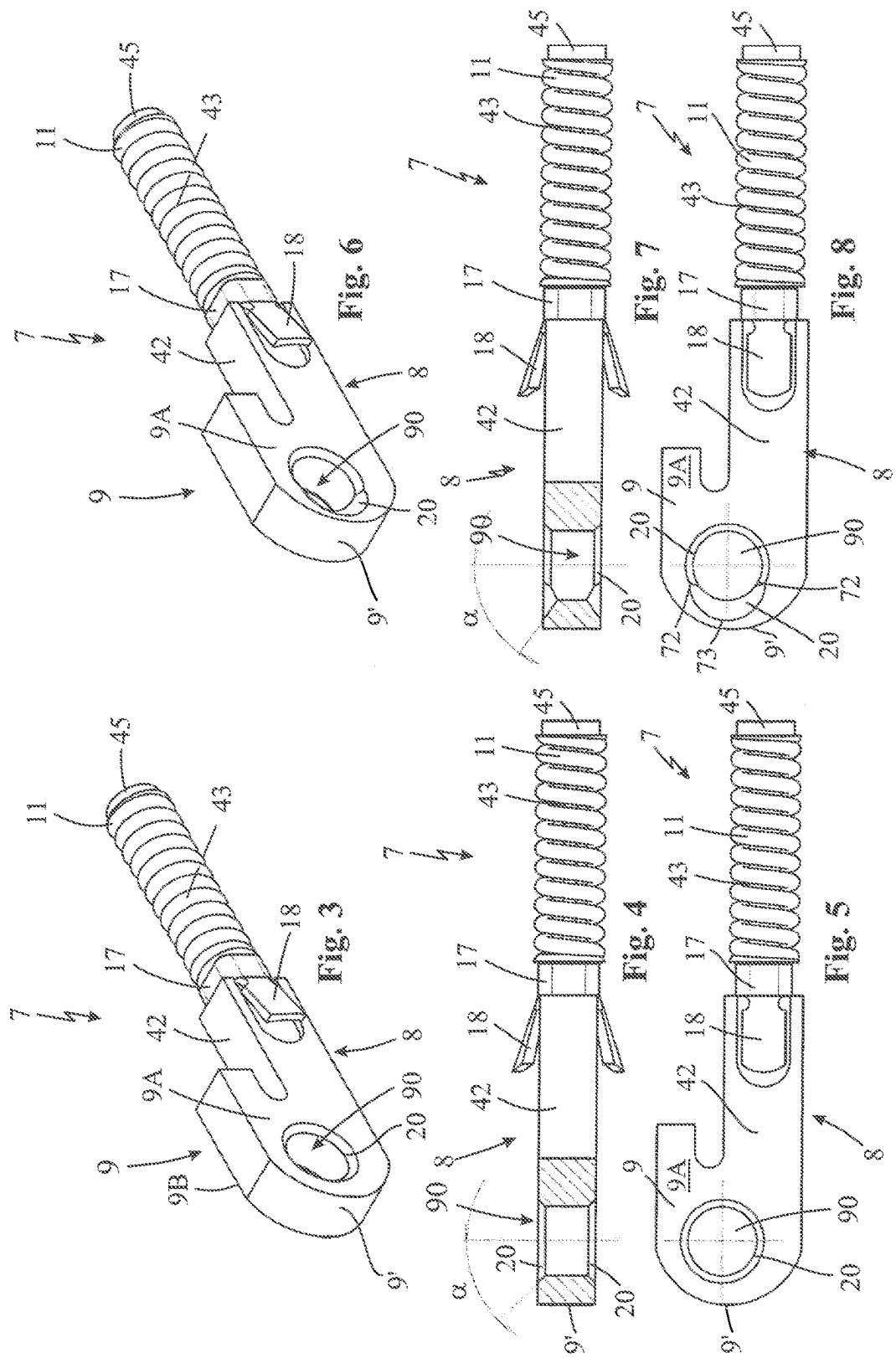

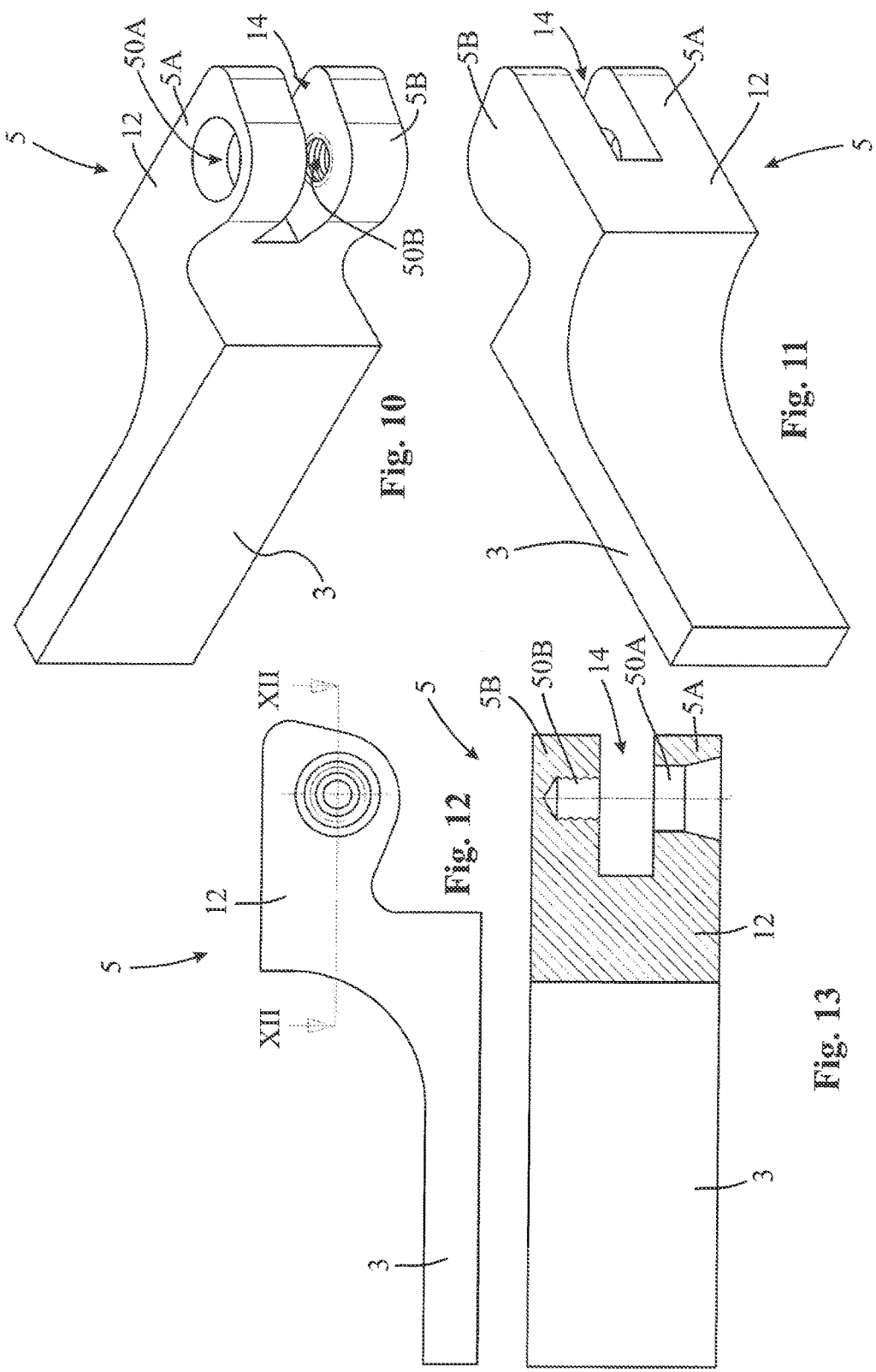

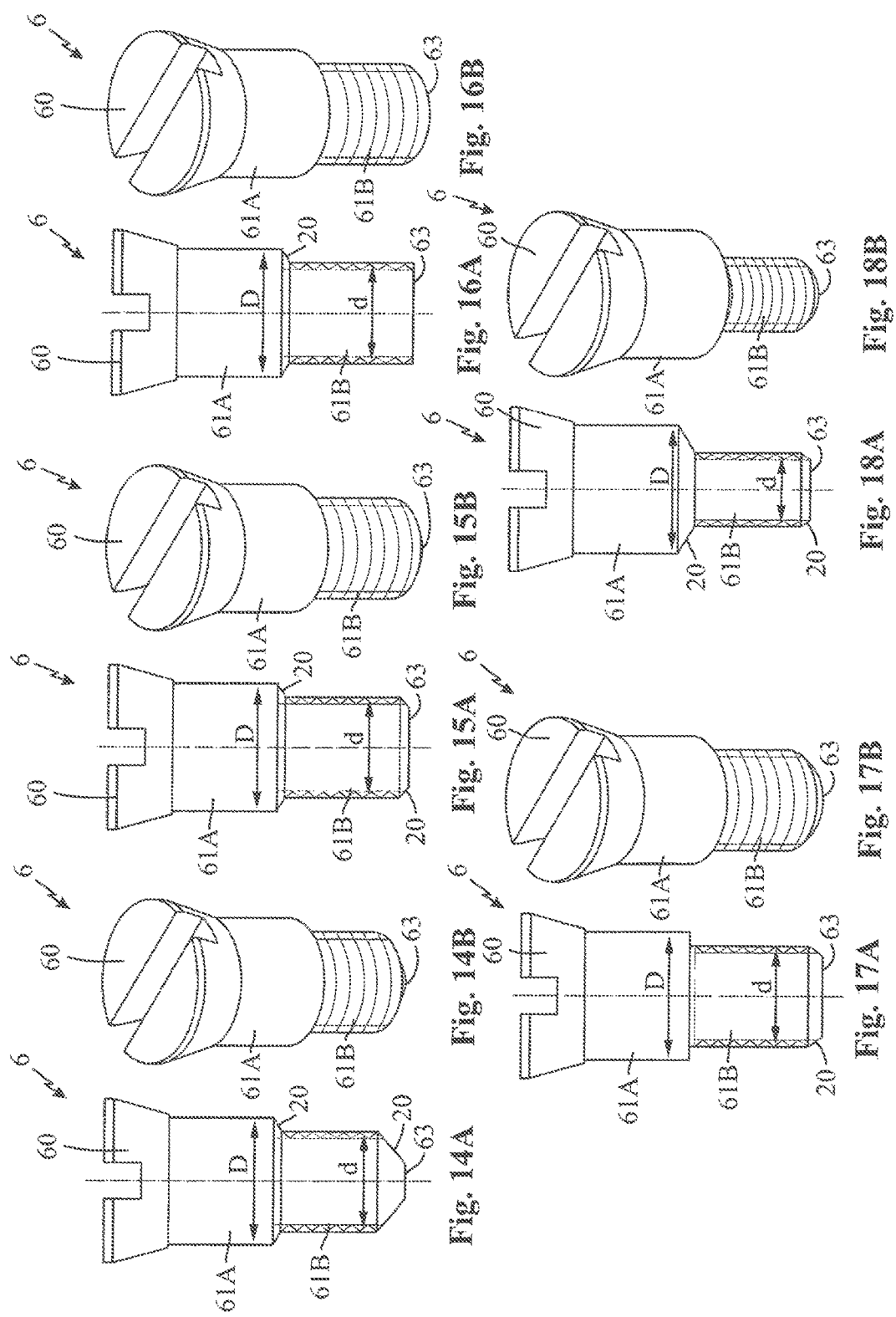

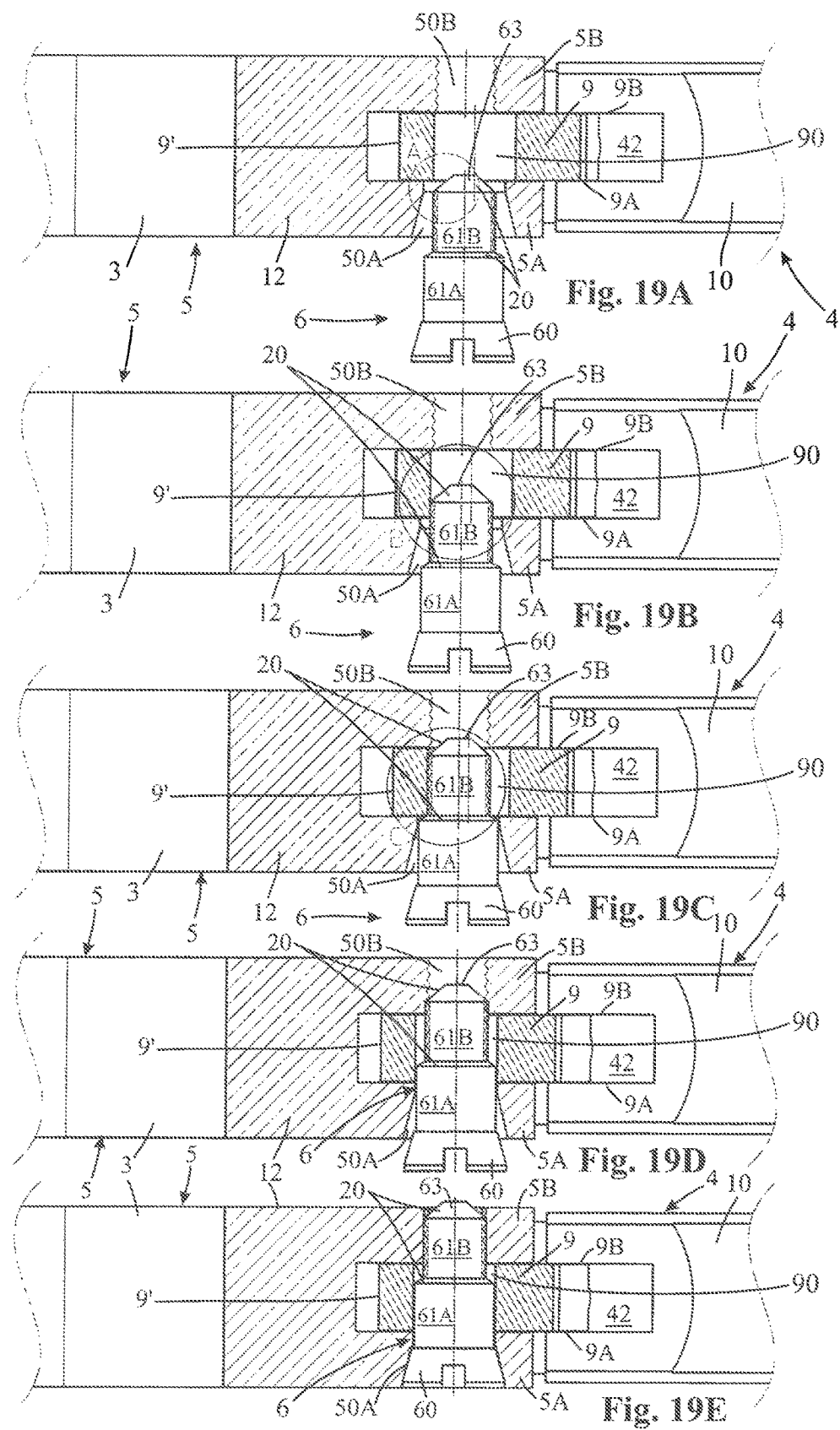

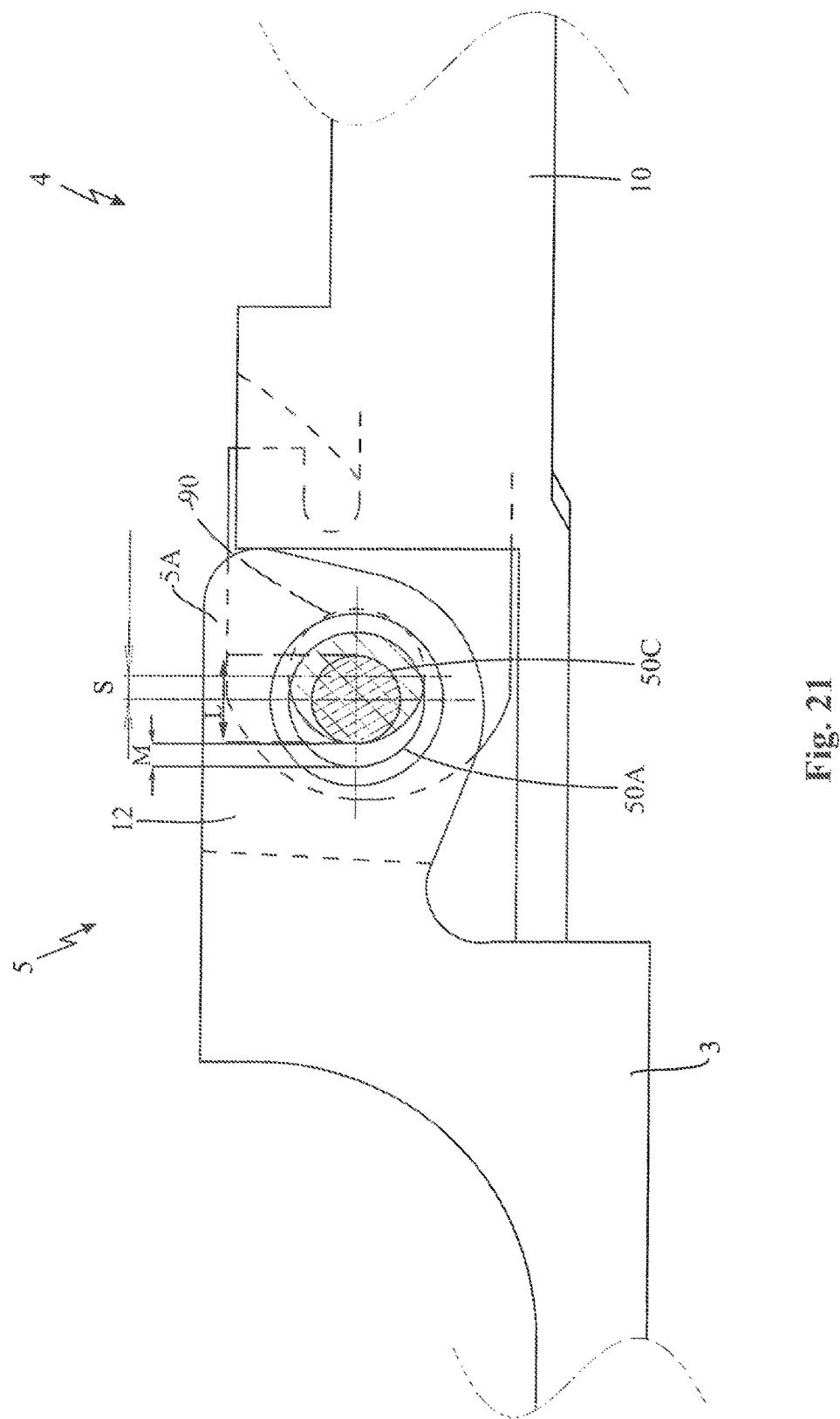

PROCESS FOR ASSEMBLING AN ELASTIC HINGE FOR EYEGLASS FRAMES, AND ELASTIC HINGE FOR EYEGLASS FRAMES

FIELD OF APPLICATION

The present invention regards a process for assembling an elastic hinge for eyeglass frames, and an elastic hinge for eyeglass frames.

The present process and elastic hinge are intended to be advantageously employed in the production of eyeglass frames, made of plastic or metal, in particular of the type provided with two articulations coupled together by means of a pin that must overcome an elastic pre-compression force associated with one articulation. The present invention is susceptible of speeding up the production process and limiting, as much as possible, the presence of anti-aesthetic components of the hinge.

Therefore, the hinge, object of the present invention, is inserted in the industrial eyeglass field or in the field of production of eyeglasses, accessories and components for eyeglasses.

STATE OF THE ART

Conventionally in the eyeglass field, hinges are employed for articulating the temples to the front of a frame.

Each hinge is usually formed by two articulation elements, pivoted together, of which respectively a first element is fixed to a temple and a second element is fixed to a lateral portion of the front of the frame (also known, in the technical jargon of the field, with the term of "end piece").

In operation, the hinges allow the temples to rotate between a closed position, in which they are collected on the front of the eyeglasses, and an open position, in which they assume a substantially right-angle position with respect to the front adapted to allow the use thereof on the face of the user.

In particular, the present invention refers to so-called "elastic" hinges, i.e. to hinges that allow moving the temples between the aforesaid positions by overcoming an opposing force exerted by an elastic device associated with the hinge.

The elastic device allows numerous advantages, including that of allowing the user to more easily put on the eyeglasses, since the temples can be moved for an over-travel beyond the aforesaid open position in order to then be released, once the eyeglasses are worn, on the head of the user, exerting a slight pressure thereon. Such pressure allows the temples to be maintained always adherent to the head of the user, ensuring an optimal stability of the eyeglasses in different use conditions.

The elastic device also allows maintaining the temples collected behind the front in a stable closure condition.

The elastic device associated with the first articulation element fixed to the temple usually comprises one or more elastic mechanisms, usually constituted by flex carriages.

Each carriage is housed within a corresponding elongated seat, fixed to the temple along its longitudinal extension axis.

The seat is directly obtained on the temple or it is made on a fitted box-like body.

Each carriage is susceptible of sliding along the longitudinal axis of the seat and it is elastically returned towards the interior of the seat itself by at least one spring.

The first articulation elements associated with the elastic mechanisms are pivoted by means of a hinge pin to the second articulation elements fixed to the end piece. For such purpose, the pin is engaged in aligned holes of the two articulation elements.

In order to exert this suitable pressure on the temples of the user, it is necessary that the spring of the elastic device be suitably pre-compressed already during the mounting of the carriage. In addition, it is almost always necessary that the spring of the elastic device be further subjected to an additional preloading that is attained during the hinge assembly process, providing for a certain non-alignment between the holes of the two articulation elements, before the insertion of the pin.

This non-alignment between the holes of the first movable articulation element, associated with the elastic mechanism of the temple, and the holes of the second fixed articulation element, associated with the end piece, is recovered during the mounting of the hinge pin. Indeed, with the insertion of the hinge pin, the elastic mechanism is forced for a section that allows aligning the holes of the two articulation elements together, actually obtaining the further preloading of the elastic device.

Therefore, the assembly processes for the elastic hinges of known type require recovering the non-alignment of the two articulations for the insertion of the pin. Such operation has in practice proven very complex to achieve, whether manually for example by an optician or automatically in the case for example of automated screwing in the industrial eyeglass production processes.

In other words, the operation of centering the articulations before being able to insert the pin is an additional, hard-to-achieve operation.

Regardless of the difficulty of the aforesaid operation, the process still involves a centering step that negatively affects the production process or complicates the work of the optician.

In order to overcome this drawback, assembly processes are known which employ self-centering screws, of the type described for example in the patent FR-A-2658570. In accordance with such known elastic hinge, the pin comprises, following a threaded stein portion, also a non-threaded extension portion.

This extension portion advantageously has reduced diameter respect to the diameter of the threaded portion and accomplishes the object of facilitating the centering of the two articulation elements during the process of assembly of the elastic hinge. After the pin has been mounted, its extension portion is easily broken or removed, actually reducing the self-centering pin to a conventional screw.

The elastic hinge assembly processes that employ self-centering screws as described above have the disadvantage that, once the extension portion of the hinge pin is broken—such portion serving to facilitate the centering of the hinge—the same pin becomes a conventional screw and hence in case of dismounting and subsequent remounting of the hinge, there is once again the problem of centering the holes.

A further drawback of the assembly processes that employ these known hinges lies in the fact that the extension portion of the stem of the hinge pin is material that is lost, with a consequent increase of the production costs.

One drawback of the same hinges with self-centering pin of the above-described known type lies in the fact that they cannot be applied to frames that provide for concealing from view the hole of the relative hinge articulation, placed at the end of the stem of the pin.

Indeed, for aesthetic reasons this can be concealed by an extension portion of the temple or it can be concealed by making the same hole of the last tab of the second articulation, in which the end of the pin is engaged, in a blind manner such that the same tab appears externally clean/tree and completely flat.

In neither case is it possible to use this self-centering screw type, since the extension portion cannot project from the hole.

In order to overcome the difficulties of the assembly processes of known type which require recovering the non-alignment of the two articulations for the insertion of the hinge pin and simultaneously meeting the aforesaid aesthetic needs, the patent IT-A-UD2007000224 provides for connecting the two articulations with a pin when the carriage is disengaged from the temple, and then only later inserting the carriage in the seat with the desired load of the elastic device by employing a screw for locking the carriage in the load position of the desired spring. Such screw is nevertheless a third element, with respect to the frame, that remains visible and that is necessary for locking the carriages with the desired preloading.

Therefore, the elastic hinge assembly processes present on the market today have the drawback of not allowing the coupling of articulations with the due elastic load, in a simple and inexpensive manner though the insertion of the hinge pin. In addition, the hinges employed often have the aesthetic drawback of not being able to conceal from sight all the components of the hinge.

Elastic hinge assembly processes are also known which confront the problem of non-alignment, but these are aimed for making elastic hinges that prevent the anti-unscrewing of the hinge screws following friction with the articulations during the temple opening and closing operations. A process for assembling an elastic hinge is known for example from the patent EP 345145; such process is provided with an intermediate thinned portion, i.e. interposed between a head portion drivable in rotation with a tool, and a threaded end portion for use with a tab of a female articulation provided with the "piston-spring" mechanism.

In this case, once the hinge is assembled, the central tab of the male articulation is inserted between the two tabs of the female articulation, coming to engage the recess of the thinned portion, preventing therewith any possible subsequent unthreading of the pin.

Nevertheless, the assembly process described in this patent does not overcome, through the shaped form of the pin, the abovementioned problem of the necessary alignment between the articulations for the subsequent insertion of the pin.

On the other hand, hinges are known of non-elastic type provided with shaped screws, or longitudinally divided into portions of different shape, of which one or more portions are provided with thread. Such hinges do not confront the problem of alignment of the articulations, since this is a problem only felt in the assembly processes for elastic hinges.

PRESENTATION OF THE INVENTION

In this situation, the problem underlying the present invention is to eliminate the drawbacks of the abovementioned prior art, by providing a process for assembling an elastic hinge that allows an easy mounting of the hinge pin.

A further object of the present finding is to provide a process for assembling an elastic hinge that is entirely reliable in operation.

A further object of the present finding is to provide a process for assembling a hinge for eyeglass frames that is quick and easy to produce.

A further object of the present finding is to provide a process for assembling a hinge for eyeglass frames that is executable in a simple manner, even after the dismounting of the hinge after its assembly during eyeglass production, either by an optician or by the same user.

A further object of the present finding is to provide a process for assembling a hinge for eyeglass frames which is inexpensive to produce.

A further object of the present finding is to provide an elastic hinge for eyeglass frames which is entirely satisfactory from an aesthetic standpoint.

A further object of the present finding is to provide an elastic hinge for eyeglass frames which allows concealing, from sight, the hole of the hinge articulations for the insertion of the hinge pin.

BRIEF DESCRIPTION OF THE DRAWINGS

The technical characteristics of the finding, according to the aforesaid objects, and the advantages thereof will be clearer from the following detailed description, made with reference to the enclosed drawings, which represent several merely exemplifying and non-limiting embodiments of the invention, in which:

FIG. 1 shows an elastic hinge for eyeglass frames in a perspective view, according to the present invention, mounted to connect a temple and an end piece of the eyeglass frame, with the temple and the end piece illustrated only in part and with the temple in open position;

FIG. 2 shows the elastic hinge of FIG. 1 in a side view in section, made along a longitudinal plane placed along the extension axis of the temple;

FIG. 3 shows a detail of the hinge of the preceding figures according to the present invention and relative to a first embodiment of a elastic carriage represented in a perspective view;

FIG. 4 shows the elastic carriage of FIG. 3 in a top view with only the portion at the hinge pin depicted in section;

FIG. 5 shows the elastic carriage of FIG. 3 in a side view;

FIGS. 6, 7 and 8 show a second embodiment of an elastic carriage of the hinge according to the invention respectively represented in a perspective view, in a top view partially in section and in a side view;

FIG. 10 shows a first perspective view of a detail of the hinge in accordance with the present invention relative to the second female articulation;

FIG. 11 shows a second perspective view of a detail of the hinge in accordance with the present invention relative to the second female articulation;

FIG. 12 shows the second female articulation of FIG. 10 in a side view;

FIG. 13 shows the female articulation of FIG. 12 in a side view and in section carried out at the passage hole for the pin along trace XII-XII of the same FIG. 12;

FIGS. 14A and 14B respectively show, in a side view and in a perspective view, a detail of the hinge in accordance with the present invention relative to a first embodiment of the connection pin of the articulations;

FIGS. 15A and 15B respectively show, in a side view and in a perspective view, a second embodiment of the connection pin of the articulations;

FIGS. 16A and 16B respectively show, in a side view and in a perspective view, a third embodiment of the connection pin of the articulations;

FIGS. 17A and 17B respectively show, in a side view and in a perspective view, a fourth embodiment of the connection pin of the articulations;

FIGS. 18A and 18B respectively show, in a side view and in a perspective view, a fifth embodiment of the connection pin of the articulations;

FIGS. 19A, 19B, 19C, 19D and 19E show the hinge in accordance with the present invention, in a sequence of operations during the step of inserting the hinge pin;

FIG. 21 shows a top schematic view of a portion of the hinge in accordance with the present invention, with a dashed line indicating the visible part of the hole of the first male articulation connected to the temple and a net-like surface indicating the maximum circle inscribable in the non-alignment between the two holes of the two articulation elements.

DETAILED DESCRIPTION OF A PREFERRED EMBODIMENT

Figure 9:
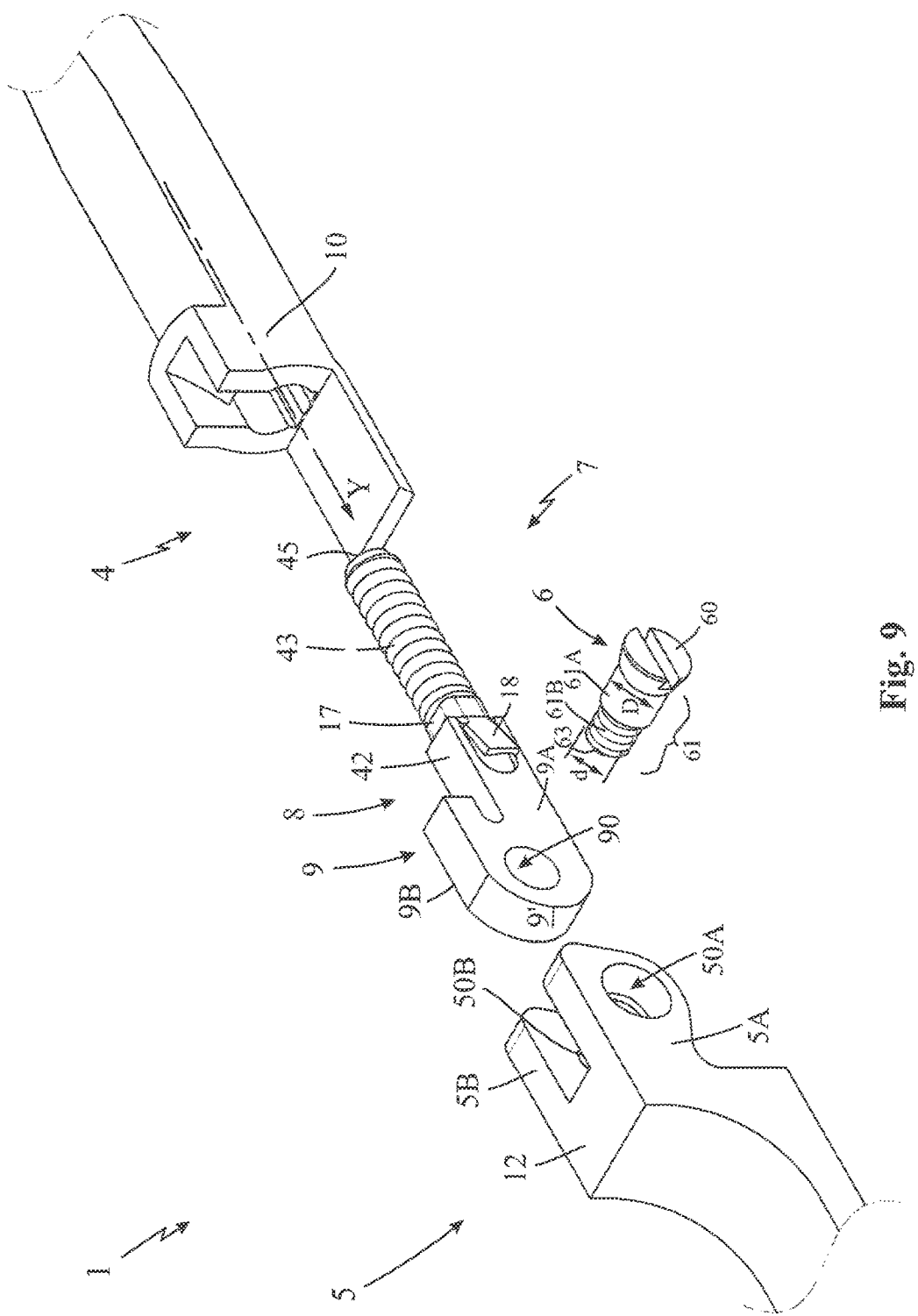
FIG. 9 shows the hinge of FIGS. 1-2 in a perspective view, disassembled from the frame with the components partially exploded.
Figure 20A:
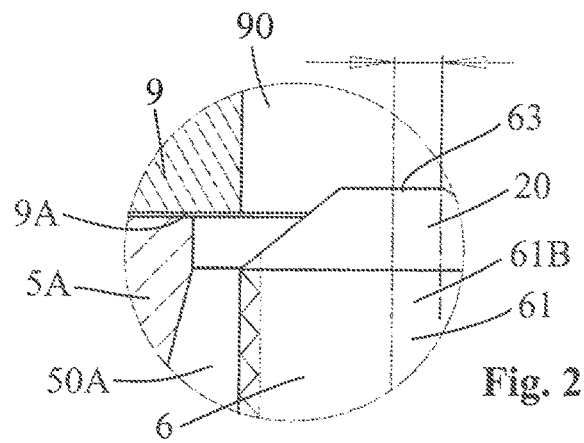
FIGS. 20A, 20B and 20C respectively show three enlarged views of the end of the hinge pin of FIGS. 19A, 19B and 19C.
Figure 20B:
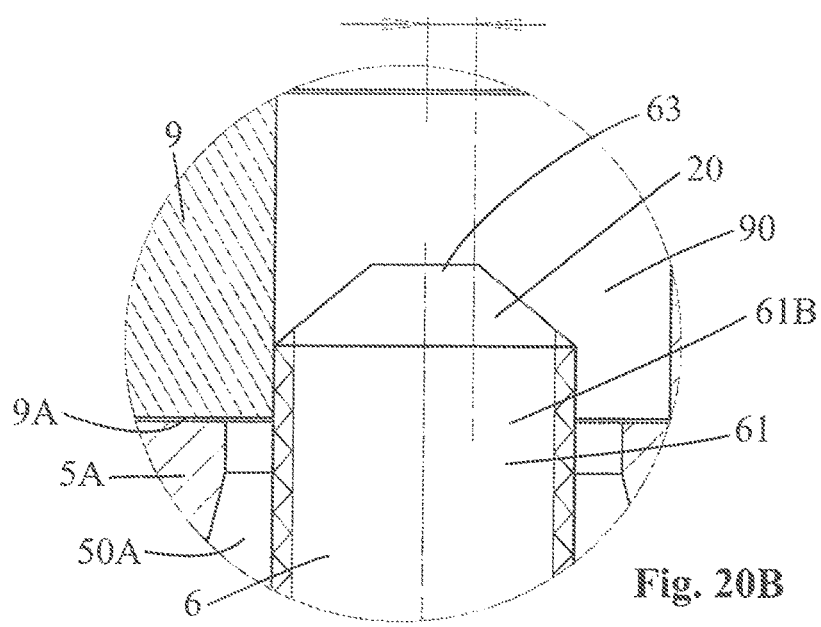
Figure 20C:
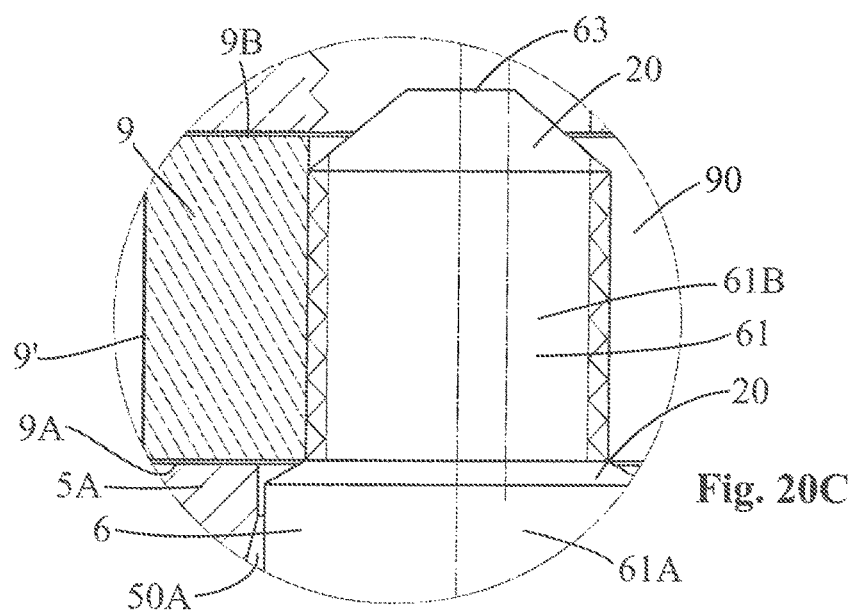

With reference to the drawing set, reference number 1 overall indicates the elastic hinge for eyeglass frames, object of the present invention.

The elastic hinge 1, according to the present invention, is intended for making eyeglass frames both of conventional and sports type and is adapted to mutually articulate together, in a per se known manner, a temple 2 and an end piece 3 of an eyeglass frame.

The latter will be made in a per se entirely conventional manner, hence for example of plastic material, such as nylon, or other plastic materials suitable for such purpose, or of metal material. The frame will be only be briefly described hereinbelow, since its main structural principles are well known to the man skilled in the art.

More in detail, the frame is usually formed, in a per se conventional manner, by a front that supports a pair of lenses, connected in the central part by a bridge, and by a pair of temples 2 pivoted by means of elastic hinges 1 to the sides of the front and, more precisely, to two lateral portions thereof directed towards the rear part of the eyeglasses and known in the technical jargon of the field with the term of end pieces 3.

The hinge 1 according to the present invention is of elasticized type, i.e. adapted to allow an over-travel in the opening of the temples 2, with elastic return aimed to allow easily putting on the eyeglasses and aimed to ensure an improved fit of the same once placed on the head of the user.

In operation, the temples 2 can be moved, due to the aforesaid elastic hinges 1, in a per se entirely conventional manner, between a closed position, in which they are collected on the front of the eyeglasses, an open position, in which they assume a substantially right-angle position with respect to the front of the eyeglasses, and an over-travel position, in which they are forced beyond the aforesaid open position.

The elastic hinge 1 comprises two articulation elements mechanically associated with each other by means of a hinge pin 6.

More in detail, a first articulation element 4 represents the male of the hinge and is mechanically associable with a first component of the frame of the eyeglasses represented, in accordance with the embodiments of the enclosed figures, by a temple 2 of the frame; the second articulation element 5, i.e. the female element of the hinge, is in turn mechanically associable with a second component of the eyeglass frame which is represented by the end piece 3 of the front of the eyeglasses in accordance with the embodiments of the enclosed figures.

Of course, without departing from the protective scope of the present invention, the first articulation element 4 can instead be associated with the end piece 3 while correspondingly the second articulation element 5 will be associated with the temple 2.

The first articulation element 4 comprises an elastic device 7, which is housed in a seat of a containment structure 10 preferably associated, in accordance with the examples of the enclosed figures, with the temple 2 of the frame also because the elongated form thereof makes it more suitable for mounting the containment structure 10 rather than associating the latter with the end piece 3 of the frame, usually having limited longitudinal extension.

The containment structure 10 can be obtained with a box-like body fixed to the temple 2, or it can be obtained within the temple 2 directly during the manufacturing thereof.

The containment structure 10 is therefore preferably extended in an elongated manner along a longitudinal axis Y parallel to the axis of the temple 2.

More in detail, the elastic device 7 comprises a carriage 8, slidably movable within the seat of the containment structure 10 and provided at an end thereof with a head portion 9, at least partially projecting outside the seat of the containment structure 10.

Such head portion 9 is provided with a corresponding first hole 90 which is extended in a through manner between two lateral faces 9A, 9B of the same head portion 9.

The elastic device 7 then comprises a spring 11 elastically acting on the carriage 8 in order to force it towards the interior of the seat of the containment structure 10.

In turn, the second articulation element 5 comprises two shoulders 5A, 5B, provided with corresponding second holes 50A and 50B axially aligned with each other, of which one is smooth initial 50A and one final threaded 50B.

More clearly, the first shoulder 5A of the two shoulders 5A, 5B of the second articulation element 5 is provided with a second through hole 50A, which is the initial hole in the direction of insertion of the hinge pin 6 and is smooth or lacks thread. This is also advantageously shaped in order to house, with shape coupling, the head 60 of the pin 6. The second shoulder 5B of the two shoulders 5A, 5B of the second articulation element 5 is provided with a second hole 50B, which is the final hole in the direction of insertion of the hinge pin 6 and is threaded in order to allow the engagement via screwing of a threaded portion 61B of the stem 61 of the hinge pin 6, as better specified hereinbelow. This second hole 50B can be through, as depicted in FIGS. 19A-19E, or blind as represented in FIGS. 10-13.

The two shoulders 5A, 5B delimit a slit 14 between them, in which the head portion 9 of the first articulation element 4.

The first and the second articulation element 4 and 5 are thus mutually pivoted together by means of the hinge pin 6 mentioned above, inserted in the first hole 90 and in the abovementioned second holes 50A, 50B with transverse axis X.

Such hinge pin 6 is advantageously constituted by a screw.

More in detail, the carriage 8 of the first articulation element 4, mentioned above, is provided with a main longitudinal extension along the longitudinal sliding axis Y parallel to that of the temple 2 and is composed of a neck portion 42 and of a rod-like portion 43 and of the aforesaid head portion 9.

Advantageously, the neck portion 42 is extended to the rear of the head portion 9 along the longitudinal extension axis Y and is shaped with an advantageously prismatic form, e.g. parallelepiped, in order to prevent the rotation of the carriage 8 around its longitudinal extension axis within the seat of the containment structure 10, which is suitably shaped in its initial guide section with respect to the aforesaid neck portion 42.

The rod-like portion 43 is extended starting from the rear face of the neck portion 42 and has, at the free end, an enlarged head 45 constituted for example by the head of a screw or of a pin or by a riveting of the end of the rod-like portion 43.

The abovementioned spring 11 aimed to push the carriage 8 towards the interior of the containment structure 10 is advantageously coaxially wound around the rod-like portion 43 and abuts with its ends on one side against the enlarged head 45 of the rod-like portion 43, and on the other side against an end stop obtained for example with step or ring or another element entirely projecting from the containment structure 10 (e.g. produced by means of punching) in order to interfere with the spring 11.

Advantageously, the aforesaid end stop is obtained with a locking element constituted by a ring 17 coaxially mounted around the rod-like portion 43 and provided with two elastic tabs 18 which ensure that once the carriage 8 is inserted in the containment structure 10, they are engaged within the latter, defining with the ring 17 the locking of the carriage 8 in the relative containment structure 10 with only one degree of freedom of the sliding along the axis Y.

The abovementioned second articulation element 5 can for example be obtained in a per se entirely conventional manner with a metal body provided with the two parallel shoulders 5A and 5B fixed to a common base 12 from which, for example, one or more feet are extended, embedded in the plastic matrix of the end piece 3 of the eyeglasses.

Otherwise, without departing from the protective scope of the present patent, the second articulation element 5 can be integrally made, still in a per se entirely conventional manner, in the plastic material of the end piece 3 with the two parallel shoulders obtained in a single body in the plastic of the end piece 3.

In addition, differently, in the case of metal eyeglasses, and in accordance with the example illustrated in the enclosed figures, the second articulation element 5 can be obtained in a welded metal body or it can be integrally obtained with the end piece 3 of the frame.

In operation, as can be seen from the enclosed figures and as per se already known to a man skilled in the art, the cam profile of the shoulders 5A, 5B determines, by cooperating together with the front surface of the containment structure 10, the open, closed and over-travel positions of the temples.

In accordance with the present invention, the elastic device 7 slidably movable along the longitudinal axis Y of the containment structure 10 provides that the spring 11 acts on the head portion 9 of the carriage 8, by transmitting an elastic action thereto.

More in detail, the above-considered hinge pin 6 advantageously comprises a head 60 and a stem 61 connected in a single body to the head 60, and provided with a free end 63 opposite the head 60.

According to the idea underlying the present invention, the stem 61 of the hinge pin 6 is provided with a smooth intermediate portion 61A connected to the head 60, and with a thinned final portion 61B, connected to the intermediate portion 61A and provided with cross section of diameter d smaller than the diameter D of the cross section of the intermediate portion 61A. The aforesaid thinned final portion 61B is provided with a thread that is engaged in screwing relationship with a nut screw made in the final threaded second hole 50B of the second shoulder 5B of the second articulation 5.

In addition, still according to the idea underlying the present invention, the hinge 1 is provided with a tilted slide surface 20, which is provided on at least one of the opposite lateral surfaces of the hinge pin 6, inside the first hole 90 of the head portion of the first articulation 90, in order to facilitate the insertion of the pin in the first hole 90 of the head portion 9 of the first articulation 4 and in the second holes 50A and 50B of the shoulders 5A, 5B of the second articulation 5.

In operation, the tilted slide surface 20 is intercepted during the insertion of the pin 6, whether this is made on the internal surface of the first hole 90 of the head portion 9 of the first articulation 4 (at the edge of the hole on the lateral face 9A that the pin first encounters) or on the lateral surface of the pin 6, and determines the sliding of the carriage 8 of the elastic device 7 along its longitudinal axis Y of the containment structure 10.

Indeed, the tilted slide surface 20 has tilt oriented towards the central axis of the first through hole 90 with average tilt angle $\alpha$ (preferably between 25° and 65°) and consequently the force of insertion of the hinge pin 6, which is expressed on the slide surface 20, is advantageously broken down into at least one component that overcomes the elastic return force of the spring 11.

In this manner, the carriage 8 is forced to slide within the containment structure 10 until the first through hole 90 of the head portion 9 is brought into alignment with the second through holes 50A, 50B of the shoulders 5A, 5B of the second articulation 5.

The slide surface 20 can be tilted in a constant manner according to the extension of a plane, or the tilt can vary such that the slide 20 assumes the geometry of an arc of a circle, of a parabola or other similar shapes.

Advantageously in accordance with the embodiment of FIGS. 3, 4 and 5, in order to eliminate the burrs of the perforation processing of the through hole 90, the latter has—at least at the lateral face 9A of the head portion 9 directed towards the head 60 of the hinge pin 6, and preferably on both lateral faces 9A, 9B of the head portion 9—a smoothed annular edge that acts as a slide surface 20.

In accordance with the preferred embodiment of FIGS. 6, 7 and 8, such smoothed edge is extended for a circular section and is connected at its ends 72 to a more extended slide surface 20.

Otherwise, the slide surface 20 can be provided—rather than annularly—even only towards the external end 9' of the head portion 9 of the first articulation 4, in that case the smoothed annular edge only having the function of preventing the processing burrs.

Preferably, therefore, the front edge of the slide surface 20 is extended towards the external end 9' of the head portion 9 of the first articulation 4 with a circular arc shape 73. Such circular arc 73 has diameter preferably greater than that of the first hole 90 and encloses the latter for an angular sector always towards the external end 9' of the head portion 9 of the first articulation 4.

More in detail, according to this variant, the slide surface 20 can be extended in the direction of the external end 9' of the head portion 9 for a depth M equal to or greater than the non-alignment S that is present between the hinge pin 6 and the through hole 90 when the two articulations 4 and 5 are engaged but the pin 6 is removed. In this manner, the edge of the free end 63 of the hinge pin 6 interfere with the tilted slide surface 20 by forcing the head portion 9 of the carriage 8 to translate towards the exterior of the containment structure 10.

Advantageously, the thinned portion 61B suitably has a diameter equal to the area of the circle inscribable in the opening L which is between the first hole 90 and the second holes 50A, 50B (represented by the net-like background in FIG. 21) following the non-alignment S. In this manner, the thinned portion 61B will have no problem being wedged up to the final threaded second hole 50B of the shoulder 5B of the second articulation element 5 after having traversed the first hole 90 of the head portion 9 of the carriage 8, even if the holes are non-aligned with respect to each other. Advantageously, the tilted slide surface 20 of the free end 63 of the hinge pin 6 will further facilitate this first insertion step.

In accordance with the preferred embodiment of the present invention, the tilted slide surface 20 is annularly provided on the lateral surface of the pin 6 (as indicated in the FIGS. 14, 15, 16 and 18) to connect between the thinned final portion 61B and the intermediate portion 61A.

Such slide surface 20 interferes with the edge of the first hole 90 of the lateral face 9A of the head portion of the first articulation 4, by moving the carriage 8 of the elastic device 7 towards the exterior, and this involves a further loading of the spring 11.

Otherwise or furthermore, the tilted slide surface 20 is provided at least at the lateral face 9A of the head portion 9 directed towards the head 60 of the pin 6 and is extended for at least one area adjacent to the first through hole 90, being extended at least towards the external end 9' of the head portion 9 directed towards the head of the hinge pin 6.

In this case, such slide surface 20 interferes with the connection surface interposed between the thinned final portion 61B and the intermediate portion 61A of the pin 6 (which as stated can still be constituted by a tilted slide surface 20 as represented in FIGS. 14, 15, 16 and 18 but also by a step as represented in FIG. 17), by moving the carriage 8 of the elastic device 7 towards the exterior, this involving a further loading of the spring 11.

Finally, it is also possible to provide, in accordance with the present invention, that the tilted slide surface 20 be only or also provided at the free end 63 of the pin 6, as fir example is represented in FIG. 14, or to connect between the free end 63 (definable as the end surface substantially orthogonal to the extension of the stem 61) and the threaded lateral surface of the thinned portion 61B of the stem itself.

In this case, the opening L relative to the maximum circle inscribable between the holes of the two articulation elements can also be slightly smaller than the diameter d of the threaded portion 61B of the stem 61. This since the presence of the tilted slide surface 20 at the free end 63 will in any case allow the stem 61 to be wedged in the first through hole 90 with a consequent driving of the carriage 8 towards the exterior, once again producing a further loading of the spring 11 of the elastic device 7.

Preferably, however, the free end 63 of the pin 6 will be connected to the thinned final and threaded portion 61B of the stem 61 of the hinge pin 6 with an annular tilted (frustoconical) surface 20, even if with small extension (as represented in the enclosed FIGS. 15-18) so as to make a further opening for the insertion of the pin 6 or in order to facilitate the entrance of such free end 63 in the final threaded second hole 50B of the second shoulder 5B and hence the engagement between the relative threads.

The pin 6 can be substantially contained in the holes of the articulations 4, 5, i.e. with the head 60 within the second smooth initial shaped hole 50A of the first shoulder 5A and with the free end 63 contained within the final threaded second hole 50B of the corresponding second shoulder 5B of the second articulation 5. In this manner, it is possible to conceal the final threaded second hole 50B on the visible face of the latter shoulder 5B by making such second hole 50B blind, even without providing that the material of the temple be extended with a closure portion to cover such second hole.

The first hole 90 of the head portion 9 lacks thread and substantially has the same diameter of the intermediate portion 61A of the stem 61 of the hinge pin 6, compatibly with the need to allow an easy traversing thereof.

Also forming the object of the present invention is a process for assembling a hinge 1 for eyeglass frames, in particular of the above-described type and hereinbelow the same reference numbers will be maintained. Therefore, for description simplicity, reference will be made to the same nomenclature introduced up to now, even if it must be intended that the present process can also be employed for assembling hinges that are different from those considered above.

The aforesaid process provides for the following operative steps.

Fixing steps are provided that are per se entirely conventional, and for this reason are not described in detail since they are well known to a man skilled in the art, for fixing the first articulation element 4 to a corresponding first component of the frame (e.g. a temple 2), in a manner such that the aforesaid at least one head portion 9 is extended at least partially outside the containment structure 10, as well as the second articulation element 5 to a corresponding second component of the frame (e.g. to the end piece 3).

A step follows in which the two articulation elements 4, 5 are fit by moving the temple 2 and the front 3 close together, and then there is a step of inserting the head portion 9 in the slit 14 defined by the shoulders 5A, 5B in order to place the first hole 90 and the second holes 50A, 50B substantially in succession, even if a non-alignment S remains between the aforesaid first hole 90 and the second holes 50A, 50B aimed to then determine—as described hereinbelow—a further loading of the spring 11 of the elastic device 7. Following the aforesaid non-alignment, an opening L is defined between the first hole 90 and the second holes 50A, 50B, which corresponds to the area inscribable in the non-alignment between the holes 90, 50A and 50B in the direction transverse to the longitudinal direction Y.

The process—once a hinge pin 6 is arranged with the stem 61 provided with a smooth intermediate portion 61A, with a thinned final portion 61B provided with a thread and provided with cross section d smaller than that D of the intermediate portion 61A—then provides for a step of inserting the pin 6 within the first hole 90 and within the second holes 50A, 50B of the two articulations 4, 5.

According to the idea underlying the present invention, during the aforesaid step of inserting the pin 6 in the holes 90, 50A and 50B, its thinned final portion 61B is wedged, due to its diameter d that is reduced with respect to the diameter D of the rest of the stem 61, with the free end 63 in the opening L between the holes 90 and 50A, 50B and is engaged in screwing relationship through its thread with a nut screw made in the second final hole 50B of the second shoulder 5B of the second articulation 5.

During this same insertion step, the pin 6 intercepts the head portion 9 of the first articulation 4 by forcing, facilitated by at least one tilted slide surface 20, the carriage 8 of the elastic device 7 to slide within the containment structure 10 along the longitudinal axis Y, until the first hole 90 of the head portion 9 of the first articulation 4 is substantially aligned with the second holes 50A, 50B of the shoulders 5A, 5B of the second articulation 5.

Therefore, during the aforesaid insertion step, as mentioned above, the tilted slide surface 20—whether this is made on the internal surface of the first hole 90 of the head portion 9 of the first articulation 4 (at the edge of the hole on the lateral face 9A that the pin first encounters) or on the lateral surface of the pin 6—is intercepted such that it determines the sliding of the carriage 8 of the elastic device 7 along its longitudinal axis Y of the containment structure 10.

In accordance with the preferred embodiment of the present invention, the tilted slide surface 20 is annularly provided on the lateral surface of the pin 6 (as indicated in FIGS. 14, 15, 16 and 18) to connect between the thinned final portion 61B and the intermediate portion 61A.

During the aforesaid step of inserting the pin 6, such slide surface 20 interferes with the edge of the first hole 90 of the lateral face 9A of the head portion 9 of the first articulation 4, by moving the carriage 8 of the elastic device 7 towards the exterior, this involving a further loading of the spring 11.

Advantageously, the thinned portion 61B suitably has a diameter equal to the area, of the circle inscribable in the opening L that is between the first hole 90 and the second holes 50A, 50B (represented by the net-like background in FIG. 21) following the non-alignment S.

The free end 63 of the pin 6 reaches the final threaded second hole 50B of the shoulder 5B of the second articulation element 5, advantageously without interferences of the pin 6 with the articulations 4 and 5, i.e. before the tilted slide surface 20 provided between the thinned final portion 61B and the intermediate portion 61A intercepts the edge of the first hole 90 of the lateral face 9A of the head portion 9 of the first articulation 4. However, nothing prohibits the presence also of small interferences of the free end 63 or of the thinned final portion 61B of the pin 6 with the opening of the non-alignment S between the holes of the two articulation elements 4 and 5, interferences that can be easily recovered by the presence of the above-described slide surfaces 20.

In addition, clearly the smaller the thickness of the head portion 9 of the first articulation 4 with respect to the distance between the free end 63 and the intermediate portion 61A of the pin 6, the better the wedging of the pin at least between the articulation 5A of the second articulation 5 and the head portion 9 of the first articulation 4.

At this point, the thinned portion 61B will no longer have any problem in being wedged with the free end 63 also in the final threaded second hole 50B of the shoulder 5B of the second articulation element 5 after having traversed the first hole 90 of the head portion 9 of the carriage 8, even if the holes are non-aligned with respect to each other.

Advantageously, a tilted slide surface 20, also at the free end 63 of the hinge pin 6, will further facilitate the step of inserting the pin.

Such step of course provides for a final stage, in which after the free end 63 of the pin 6 has reached the final threaded second hole 50B of the shoulder 5B of the second articulation element 5, there is the screwing of the pin with the thread of the thinned portion 61B which is progressively engaged depth-wise in the nut screw provided in the final threaded second hole 50B of the shoulder 5B of the second articulation element 5.

The absence of thread in the second shaped hole 50A of the first shoulder 5A of the second articulation 5 and in the intermediate portion 61A of the pin 6 facilitates the first stage of the insertion of the pin 6. Preferably, the intermediate portion 61A of the pin 6 is inserted in the first hole 90 of the head portion 9, in particular substantially to size.

Otherwise or furthermore, the tilted slide surface 20 is provided at least at the lateral face 9A of the head portion 9 directed towards the head 60 of the pin 6 and is extended for at least one area adjacent to the first through hole 90, being extended at least towards the external end 9' of the head portion 9 directed towards the head of the hinge pin 6.

In this case, during the aforesaid step for inserting the pin 6, such slide surface 20 interferes at least with the connection surface interposed between the thinned final portion 61B and the intermediate portion 61A of the pin 6 (which can as stated still be constituted by a tilted slide surface 20 as represented by the FIGS. 14, 15, 16 and 18 but also by a step as represented in FIG. 17), by moving the carriage 8 of the elastic device 7 towards the exterior, this involving a further loading of the spring 11.

Finally, it is also possible to provide, in accordance with the present invention, that the tilted slide surface 20 be only or also provided at the free end 63 of the pin 6, as represented in FIG. 14.

In this case, during the aforesaid insertion step the pin 6, the opening L relative to the maximum circle inscribable between the holes of the two articulation elements can also be slightly smaller than the diameter d of the threaded portion 61B of the stem 61. This because the presence of the tilted slide surface 20 at the free end 63 will in any case allow the stem 61 to be wedged in the first through hole 90 with a consequent driving of the carriage 8 towards the exterior, once again producing a further loading of the spring 11 of the elastic device 7.

Advantageously, the slide surface 20 is obtained by means of at least one material removal step, in particular by means of milling with mill that works via pass or plunge.

At the end of the insertion step the pin 6, the free end 63 of the hinge pin 6 itself is preferably substantially contained within the second hole 50B of the corresponding second shoulder 5B of the second articulation 5, or otherwise it slightly exits outward as indicated in FIG. 19E.

The process and the hinge thus conceived therefore attain the pre-established objects and in particular are able to allow a facilitated possibility for assembly by realigning the holes of the two articulations. In addition, due to the present hinge, it is possible to prevent blemishes due to visible parts thereof, and simultaneously such hinge is susceptible of being mounted with an industrial process that is easily automated and hence not costly.

It is however clear that modifications can be made to the elastic hinge described up to now, without departing from the scope of the invention. For example, nothing prohibits the articulation element which comprises the elastic device from being arranged on the end piece of the eyeglasses rather than on the temple.

The invention claimed is:

1. A process for assembling an elastic hinge for eyeglass frames, and such elastic hinge comprises:
   a first articulation element provided with an elastic device, and such elastic device is slidably movable along a longitudinal axis (Y) of an elongated containment structure, and is provided with a head portion projecting from said containment structure and having a first through hole;

a second articulation element comprising a first shoulder and a second shoulder delimiting a slit between them, in which the head portion of the elastic device of said first articulation element is insertable; said first shoulder and said second shoulder being provided with corresponding second holes, including a smooth initial second hole of said first shoulder and a final threaded second hole of second shoulder;

at least one hinge pin engageable in the first hole of said first articulation element and in the second holes of said second articulation element in order to rotatably couple together said first articulation element and said second articulation element, said hinge pin having a head and a stem, and such stem is connected to the head and is provided with a free end opposite said head;

said process comprising the following operative steps:

fixing said first articulation element with a first component of an eyeglass frame;

fixing said second articulation element with a second component of the eyeglass frame;

inserting the head portion of the elastic device of said first articulation element in the slit defined between said first shoulder and said second shoulder in order to place said first hole and said second holes substantially in succession, with the first hole of said head portion arranged non-aligned with respect to the second holes of said first and second shoulder, so that an opening is defined between said first hole and said second holes in a direction transverse to said longitudinal axis (Y) and said opening (L) is less wide than said first hole;

a step of arranging said hinge pin with the stem provided with:
   a smooth intermediate portion connected to said head and having a cylindrical shape;
   a thinned final portion, which is connected to said smooth intermediate portion, is provided with a thread and is provided with a first cross section (d) smaller than a second cross section (D) of said smooth intermediate portion;
   wherein the first hole of said head portion has same diameter of the second cross section (D) of the smooth intermediate portion of the stem of said hinge pin;

a step of inserting said hinge pin in the first hole of said first articulation element and in the second holes of said second articulation element, during such insertion step the thinned final portion of said hinge pin is wedged in the opening (L) between said first hole and said second holes and the thread of the thinned final portion is engaged in screwing relationship with a nut screw obtained in the second final threaded hole of the second shoulder of said second articulation element, and during such insertion step said hinge pin intercepts the head portion of the elastic device of said first articulation element, forcing, by means of at least one tilted slide surface, said elastic device to slide in said containment structure until the first hole of the head portion of said first articulation element is substantially aligned with the second holes of the first and second shoulder of said second articulation element.

2. A process for assembling an elastic hinge for eyeglass frames, according to claim 1, which provides that during said insertion step, the free end of the stem of said hinge pin has limited size in said opening (L) and is wedged with the free end inside said opening (L).

3. A process for assembling an elastic hinge for eyeglass frames, according to claim 1, which provides that during said insertion step, said hinge pin forces the sliding of said elastic device by means of the tilted slide surface, which is annularly provided on a lateral surface of said hinge pin to connect between the thinned final portion and the smooth intermediate portion and interferes with the head portion of the elastic device of said first articulation element.

4. A process for assembling an elastic hinge for eyeglass frames, according to claim 3, wherein said thinned final portion has section substantially equal to said opening (L); the free end of said hinge pin reaching, during said insertion step, the final threaded second hole of the second shoulder of said second articulation element without interfering with the head portion of the elastic device of said first articulation element;

said process providing that the free end of said hinge pin reaches, during said insertion step, the second final threaded hole of the second shoulder of said second articulation element before the tilted slide surface of said hinge pin interferes with the edge of the first hole of the head portion of the elastic device of said first articulation element.

5. A process for assembling an elastic hinge for eyeglass frames, according to claim 1, which provides that during said insertion step, said hinge pin forces the sliding of said elastic device by means of the tilted slide surface, which is provided at said free end and comes to interfere with an edge of said first hole of the head portion of the elastic device of said first articulation element.

6. A process for assembling an elastic hinge for eyeglass frames, according to claim 1, which provides that during said insertion step, said hinge pin forces the sliding of said elastic device by means of the tilted slide surface, wherein the tilted slide surface is provided at least on a lateral face of the head portion of the elastic device of said first articulation element directed towards the head of said hinge pin, and affects at least one area adjacent to said first hole that is extended towards an external end of said head portion directed towards the head of said hinge pin.

7. A process for assembling an elastic hinge for eyeglass frames, according to claim 1, which provides that said thinned final portion has section substantially equal to said opening (L); the free end of said hinge pin reaching, during said insertion step, the second final threaded hole of the second shoulder of said second articulation element without interfering with the head portion of the elastic device of said first articulation element.

8. An elastic hinge for eyeglass frames, which comprises:
   a first articulation element provided with an elastic device, and such elastic device is slidably movable along a longitudinal axis (Y) of an elongated containment structure, and is provided with a head portion, projecting from said containment structure and having a first through hole;
   a second articulation element comprising a first shoulder and a second shoulder delimiting a slit between them, in which the head portion of said first articulation element is insertable; said first shoulder and second shoulder being provided with corresponding second holes, including an initial smooth second hole of said first shoulder and a final threaded second hole of said second shoulder;
   at least one hinge pin engageable in the first hole of said first articulation element and in the second holes of said second articulation element in order to rotatably couple together said first articulation element and said second articulation element, said hinge pin having a head and a stem, and such stem is connected to the head and is provided with a free end opposite said head;
wherein said hinge pin is provided with:
  a smooth intermediate portion connected to said head and having a cylindrical shape;
  a thinned final portion, which is connected to said smooth intermediate portion, is provided with a first cross section (d) smaller than a second cross section (D) of said smooth intermediate portion and is provided with a thread engaged in screwing relationship with a nut screw obtained in the second final threaded hole (50B) of the second shoulder of said second articulation element,
wherein the first hole of said head portion has same diameter of the second cross section (D) of the smooth intermediate portion of the stem of said hinge pin;
a tilted slide surface being provided on at least one of the opposite lateral surfaces of said hinge pin or of the first hole of the head portion of the elastic device of said first articulation element, in order to facilitate the insertion of said hinge pin in the first hole of the head portion of the elastic device of said first articulation element and in the second holes of the first and second shoulder of said second articulation element.

9. An elastic hinge for eyeglass frames, according to claim 8, wherein said tilted slide surface is annularly provided on the lateral surface of said hinge pin to connect between the thinned final portion and the smooth intermediate portion.

10. An elastic hinge for eyeglass frames, according to claim 8, wherein said tilted slide surface is provided at the free end of said hinge pin.

11. An elastic hinge for eyeglass frames, according to claim 8, wherein said tilted slide surface is provided at least on the lateral face of the head portion of the elastic device of said first articulation element directed towards the head of said hinge pin, and affects at least one area adjacent to said first hole that is extended towards an external end (9') of said head portion directed towards the head of said hinge pin.

\* \* \* \* \*